(12) United States Patent
Beliveau (10) Patent No.: US 11,059,122 B2
(45) Date of Patent: Jul. 13, 2021

(54) CONNECTING PLASMA ARC TORCHES AND RELATED SYSTEMS AND METHODS

(71) Applicant: HYPERTHERM, INC., Hanover, NH (US)

(72) Inventor: Jeremy Beliveau, Cornish, NH (US)

(73) Assignee: Hypertherm, Inc., Hanover, NH (US)

( * ) Notice: Subject to any disclaimer, the term of this patent is extended or adjusted under 35 U.S.C. 154(b) by 406 days.

(21) Appl. No.: 15/845,711

(22) Filed: Dec. 18, 2017

(65) Prior Publication Data

US 2018/0169783 A1 Jun. 21, 2018

Related U.S. Application Data

(60) Provisional application No. 62/436,203, filed on Dec. 19, 2016.

(51) Int. Cl.
*B23K 9/32* (2006.01)
*B23K 9/10* (2006.01)
*B23K 9/013* (2006.01)
*B23K 10/02* (2006.01)
*H05H 1/28* (2006.01)
*H05H 1/34* (2006.01)

(52) U.S. Cl.
CPC .............. *B23K 9/323* (2013.01); *B23K 9/013* (2013.01); *B23K 9/1012* (2013.01); *B23K 10/02* (2013.01); *H05H 1/28* (2013.01); *H05H 1/34* (2013.01)

(58) Field of Classification Search
CPC ...... B23K 9/323; B23K 9/1012; B23K 9/012; B23K 10/02; H05H 1/28; H05H 1/34
See application file for complete search history.

(56) References Cited

U.S. PATENT DOCUMENTS

| 4,939,339 A | * | 7/1990 | Folkening | B23K 9/323 |
| | | | | 219/137.62 |
| 5,074,802 A | | 12/1991 | Gratziani et al. | |
| 6,683,273 B2 | | 1/2004 | Conway et al. | |
| 6,713,711 B2 | | 3/2004 | Conway et al. | |
| 7,375,301 B1 | * | 5/2008 | Noujaim | H05H 1/34 |
| | | | | 219/121.47 |

(Continued)

FOREIGN PATENT DOCUMENTS

DE 8403706 U1 5/1985
DE 29804098 U1 7/1998
(Continued)

*Primary Examiner* — J C Jacyna
(74) *Attorney, Agent, or Firm* — Proskauer Rose LLP; Joseph A. Capraro, Jr.; Gerald E. Worth (57) ABSTRACT

In some aspects, contact members to connect plasma torch leads to plasma cutting systems can include: a base portion; a set of ports within the base portion that include: a coolant supply port to convey a liquid coolant from the cutting system to a plasma arc torch connected to the contact member by the torch lead, a coolant return port: i) to convey return liquid coolant from the torch to the cutting system, and ii) to convey an operational current from the cutting system to the torch, at least one gas supply port to convey processing gases to the torch, and an ohmic contact connector; and a connector to couple the base portion to the cutting system and connect each of the ports and electrical connectors to respective complementary connections of the cutting system upon coupling to the cutting system.

12 Claims, 5 Drawing Sheets

(56) References Cited

U.S. PATENT DOCUMENTS

| | | | | |
|---|---|---|---|---|
| 8,304,684 B2* | 11/2012 | Currier | ................ | B23K 10/00 |
| | | | | 219/121.48 |
| 10,278,274 B2* | 4/2019 | Sanders | ................ | B23K 9/285 |
| 2003/0100208 A1* | 5/2003 | Conway | ................ | B23K 9/323 |
| | | | | 439/191 |
| 2015/0173165 A1* | 6/2015 | Namburu | ................ | H05H 1/34 |
| | | | | 219/121.49 |
| 2016/0113102 A1 | 4/2016 | Cook et al. | | |
| 2018/0263102 A1* | 9/2018 | Currier | ................ | H05H 1/28 |

FOREIGN PATENT DOCUMENTS

| | | |
|---|---|---|
| DE | 102008014814 A1 | 9/2009 |
| JP | 2854167 B2 | 2/1999 |

* cited by examiner

CONNECTING PLASMA ARC TORCHES AND RELATED SYSTEMS AND METHODS

RELATED APPLICATIONS

This application claims the benefit of U.S. Provisional Patent Application Ser. No. 62/436,203 filed Dec. 19, 2016, entitled "Lead Connection for a Plasma Arc System," the contents of which are hereby incorporated herein by reference in their entirety.

TECHNICAL FIELD

This disclosure relates generally to plasma arc torches, and more specifically to connecting plasma arc torches to power supplies and to related systems and methods.

BACKGROUND

Some conventional torch systems (e.g., plasma arc torch systems) can include one or more electrical and gas delivery lead lines having torch lead connectors to transfer electrical current, seal liquid/gas connections, and/or provide a securing method between a torch and a power supply. Traditional lead connections at the power supply typically require a set of discrete connections for each of gas, coolant, etc., which are connected one at a time, each one being screwed and/or fastened together independently. Some conventional torch connections utilize threaded connectors to achieve these connections. In some cases, some plasma torch power supplies have multiple threaded connections to fluidly and electrically connect a torch to the power supply. Having a set of discrete connections such as this can make installation and maintenance difficult and time consuming, requiring an experienced and knowledgeable technician to even disconnect or reconnect the torch lead to the system.

SUMMARY

In some aspects, liquid-cooled plasma cutting system contact members to connect a plasma torch lead to a liquid-cooled plasma cutting system can include a base portion configured to be coupled to the plasma torch lead; a set of ports disposed within the base portion, the set of ports including: a coolant supply port to convey a liquid coolant from the liquid-cooled plasma cutting system to a plasma arc torch connected to the contact member by the plasma torch lead, a coolant return port: i) defining a passage to convey return liquid coolant from the plasma arc torch to the liquid-cooled plasma cutting system, and ii) being configured to convey an operational current from the liquid-cooled plasma cutting system to the plasma arc torch connected to the base portion by the plasma torch lead, at least one plasma processing gas supply port to convey a plasma processing gas from the liquid-cooled plasma cutting system to the plasma arc torch, and an ohmic contact connector; and a connector disposed about the base portion to couple the base portion to the liquid-cooled plasma cutting system and operably connect each of the coolant supply, the coolant return, the gas supply, and the ohmic contact connector to respective complementary connections of a torch lead receptacle of the liquid-cooled plasma cutting system upon coupling to the liquid-cooled plasma cutting system.

Embodiments can include one or more of the following features.

The pilot arc contact and the first gas supply port can each be located adjacent to the coolant supply port. The coolant return port and the coolant supply port can be disposed at opposite sides of the base portion relative to a central region. In some cases, the at least one plasma processing gas supply port can be disposed circumferentially between the coolant return port and the coolant supply port. In some cases, the ohmic contact connector can be disposed on an opposite side of the base portion than the at least one plasma processing gas supply port relative to the central region.

The base portion can define a front face from which the set of ports extend. The front face can include an electrical grounding surface for the plasma arc torch lead. At least one of the coolant supply or the coolant return ports can extend axially farther from the front face than the other ports in the set of ports.

The coolant return port can have a width that is greater than a width of the coolant supply port. The coolant return port can include a current carrying multiple contact band. The coolant supply port, the gas supply port, and the coolant return port can include o-ring sealing members. In some cases, the threads of the connector can be axially positioned relative to the base portion to engage with the torch lead receptacle before the o-ring sealing members engage with their complementary ports.

The contact member can also include a valve driver cable disposed external to the base portion and configured to communicatively connect the liquid-cooled plasma cutting system to a valve in the torch.

In some aspects, plasma torch lead plugs to connect a plasma torch lead to a liquid-cooled plasma cutting system can include: a bottom plate configured to be coupled to the plasma torch lead; a set of ports disposed in the bottom plate, the set of ports including: a coolant supply port located along an upper region of a vertical axis of the bottom plate to convey a liquid coolant from the liquid-cooled plasma cutting system to a plasma arc torch connected to the contact member by the plasma torch lead, a coolant return port located substantially opposite the coolant supply port along the vertical axis, the coolant return port: i) defining a passage to convey return liquid coolant from the plasma arc torch to the plasma torch lead, and ii) being configured to convey an operational current from the liquid-cooled plasma cutting system to the plasma arc torch connected to the base portion by the plasma torch lead, a first gas supply port located on a first side of the vertical axis to convey a first plasma processing gas from the liquid-cooled plasma cutting system to the plasma arc torch, a shield gas supply port located on the first side of the vertical axis to convey a shield gas from the liquid-cooled plasma cutting system to the plasma arc torch, a pilot arc contact located on a second side of the vertical axis substantially opposite the first side, and an ohmic contact located on the second side; and a connector disposed about the set of ports and the bottom plate, the connector configured to couple the plasma torch lead to the liquid-cooled plasma cutting system.

Embodiments can include one or more of the following features.

The ohmic contact and the shield gas supply port can be located adjacent the coolant return port. The bottom plate can include an electrical grounding contact for the plasma arc torch lead.

The lead plug can include a valve driver cable disposed external to the body and configured to communicatively connect the liquid-cooled plasma cutting system to a valve in the torch.

The lead plug can include a second gas supply port disposed between the first gas supply port and the shield gas supply port, the second gas supply port to convey a second plasma processing gas from the liquid-cooled plasma cutting system to the plasma arc torch.

In some aspects, methods of aligning and connecting a plasma arc torch lead plug to a connector of a liquid-cooled plasma cutting system can include: aligning the lead plug with the connector by inserting a coolant return port extending from a base portion of the lead plug into a coolant return opening of the connector, the coolant return port being configured to provide an operational current from the liquid-cooled plasma cutting system to a plasma arc torch connected to the lead plug; adjusting the lead plug by rotating the lead plug relative to a central axis of the coolant return port to align a connector disposed about the base portion with a complementary receiving mechanism of the connector of the liquid-cooled plasma cutting system; advancing the lead plug towards the connector to: further insert the coolant return port into the coolant return opening to establish an electrical connection between the coolant return port and the coolant return opening to provide the operational current to the plasma arc torch; insert a coolant supply port into a corresponding coolant supply opening of the connector; and engaging the connector with the complementary receiving mechanism to: establish an electrical connection between a pilot arc connector of the lead plug and a complementary pilot arc contact of the connector; establish an electrical connection between an ohmic contact of the lead plug and a complementary ohmic contact of the connector; and establish one or more fluid connections to provide processing gases to the plasma arc torch.

Embodiments can include one or more of the following features.

The establishing the electrical connection between the coolant return port and the coolant return opening can include contacting a current carrying multiple contact band disposed within the coolant return opening with the coolant return port. In some cases, the engaging the connector with the complementary receiving mechanism can include rotating a threaded connector relative to a threaded complementary receiving mechanism.

Embodiments described herein can have one or more of the following advantages.

The systems and methods described herein can provide one or more advantages over some conventional devices, such as those that have attempted to simplify the connection point by having multiple connections/tools for connecting the variety of fluids and electrical contacts or limiting the number of ports therein. Whereas, the systems and methods described herein can be advantageous over conventional solutions that may have significant electrical noise issues, rely on "D" shaped features for component alignment during installation, preheat their gases/coolant flow via cutting current transmission, and/or require the torch lead to be connected directly at the power supply. For example, by providing the electrical current through the coolant return port, rather than the coolant supply port, the electrical current provided to the torch does not significantly pre-heat coolant before it reaches the torch to cool consumables.

DETAILED DESCRIPTION

In some aspects, plasma arc processing systems can include a torch lead that has a system-side connection interface (e.g., quick connect lead interface (e.g., contact member, lead plug)) at a system end of the lead (i.e., at an end opposite the torch) that allows a user to connect the lead plug to the power supply system by simply plugging the lead plug into a complementary receptacle and screwing one fastener. In some embodiments, the lead plug can include all of the coolant inlets and outlets, pilot arc and ohmic sense contact points, gas supplies, power supplies, etc., so that the torch (e.g., via the lead plug and the lead) can be coupled and decoupled from the complementary receptacle quickly and easily.

Figure 1:
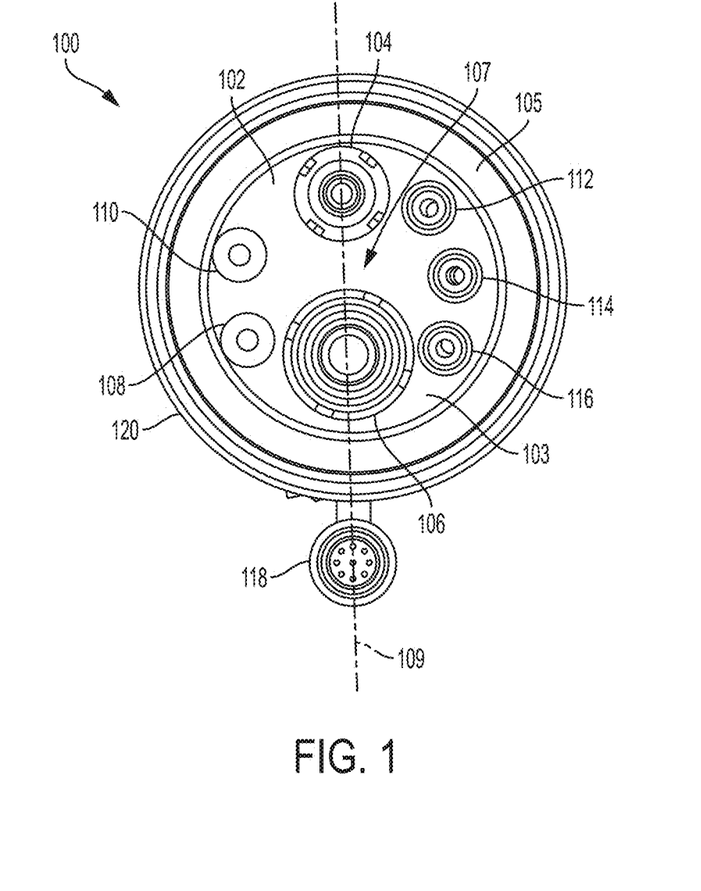
FIG. 1 is a front view of an example torch lead plug for connecting a plasma arc torch to a plasma arc processing system, where the lead plug has a connection interface to more easily align and connect the lead plug to a receptacle of a plasma arc processing system.

Referring to FIG. 1, a liquid-cooled plasma cutting system lead plug 100 to connect a plasma torch lead to a liquid-cooled plasma cutting system can include a base portion 102 configured to be coupled to the plasma torch lead. The base portion 102 includes or defines a set of ports to convey one or more fluids, gases, or electrical currents or signals from the power supply system to the torch. For example, the set of ports can include one or more coolant ports, such as a coolant supply port 104 and a coolant return port 106, one or more electrical connections, such as an ohmic contact connector 108 and a pilot arc contact connector 110, and one or more gas ports, such as a first plasma gas port 112, a second plasma gas port 114, and a shield gas port 116. In some embodiments, as discussed below, one or more of the ports can be configured to provide a combination of services to the torch to support plasma arc generation, such as transferring a combination of coolant and electrical current. In some embodiments, the base portion 102 defines a front face 103 from which the set of ports extend. As discussed below, the front face 103 can include an electrical grounding surface 105 for the plasma arc torch lead. In some examples, the electrical grounding surface 105 can include or be formed along an outer edge of the front face 103.

The coolant supply port 104 can be configured to convey a liquid coolant from the liquid-cooled plasma cutting system to a plasma arc torch connected to the lead plug by the plasma torch lead.

The coolant return port 106 can define a passage to convey return liquid coolant from the plasma arc torch to the plasma torch lead. For example, the coolant return port 106 can define a substantially cylindrical side wall that encloses a fluid passage. The coolant return port 106 can also be configured to convey (e.g., deliver, conduct) an operational current, such as a plasma cutting current, from the liquid-cooled plasma cutting system to the plasma arc torch. For example, in some cases, the side wall of the coolant return port 106 can be conductive to conduct the electrical current.

The coolant supply and return ports can be different axial lengths from the front face 103 of the base portion 102. In some embodiments, at least one of the coolant supply or the coolant return ports extend axially farther from the front face 103 than the other ports in the set of ports. For example, the coolant return port 106 can extend axially farther from the front face 103 than the other ports in the set of ports.

The coolant ports can also have different widths (e.g., diameters (e.g., internal diameters)) to control liquid coolant flow. For example, in some embodiments, the coolant return port 106 has a width that is greater than a width of the coolant supply port 104, which, in some cases, can be useful to reduce pressure drop. In some embodiments, the coolant return port 106 is larger (e.g., wider) because it can serve as the power cable to the torch, so a larger hose is used to compensate for physical space. In some cases, the coolant ports can be configured to be as large as possible given the spacing constraints of other ports around them.

Figure 2:
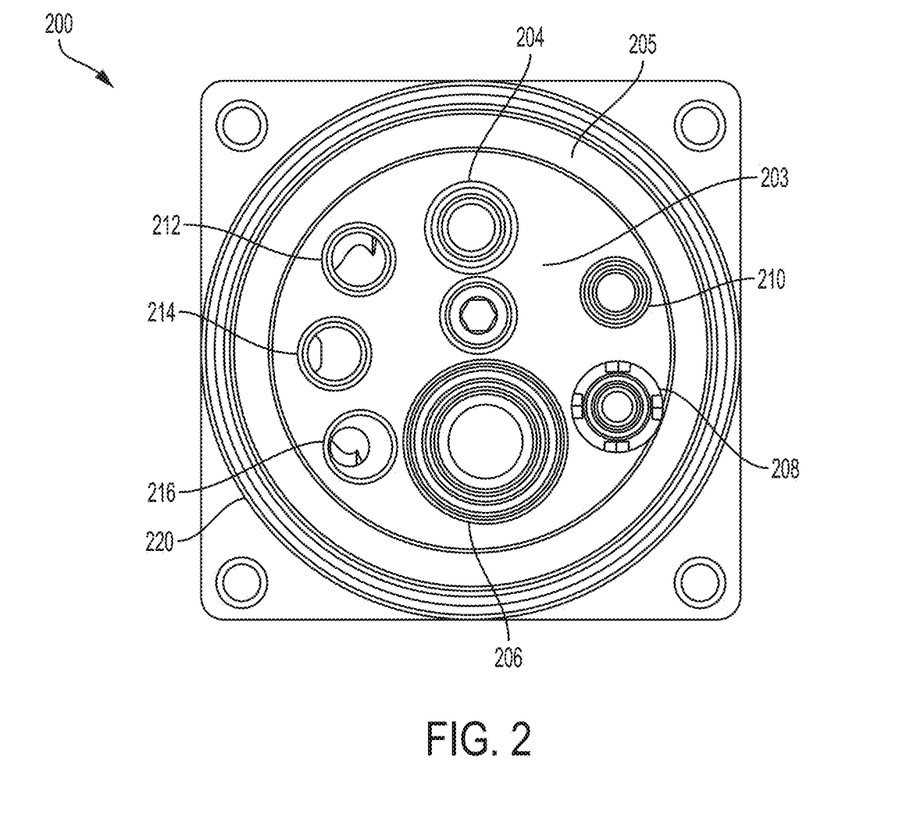
FIG. 2 is a front view of an example plasma arc processing system receptacle having a connection interface that is complementary to the lead plug of FIG. 1.

In some embodiments, power (e.g., electrical current for cutting) is delivered to the torch via the coolant return port 106. In addition to reducing a number of electrical contacts needed, utilizing the coolant return port 106, rather than other ports, such as the coolant supply port 104, can be particularly useful in order to reduce or prevent preheating of the coolant provided to the torch, which could otherwise undesirably impact cooling within the torch. In some cases, a coolant return 206 of a complementary connector (e.g., receptacle) 200, to which the lead plug 100 can connect for use, discussed in detail below, can include a current carrying multiple contact band (e.g., a Louvertac™ band) 207 that assists with electrical connection between the coolant return port 106 and the coolant return 206. Alternatively or additionally, the lead plug 100 can also include a current carrying multiple contact band (e.g., a Louvertac™ band) around one or more ports.

In some embodiments, coolant inlet and return lines (and therefore the coolant supply port 104 and the coolant return port 106) are typically electrically separated (e.g., insulated) from one another within the torch and the torch lead but are connected in the system to reduce heating via the conduction. These components can then be electrically separated at the lead plug-to-receptacle interface. In some embodiments, the coolant inlet has an electrically discontinuous section across the interface and a substantially non-conductive conduit from this point forward (e.g., to further inhibit any current which jumps the discontinuous section via the coolant fluid). For example, cross-sectional view FIG. 3E, discussed below, depicts example space/discontinuous sections used to prevent arcing across bottom components in inlet and drives current to just central return path.

The lead plug 100 can include at least one plasma processing gas supply port to convey a plasma processing gas from the liquid-cooled plasma cutting system to the plasma arc torch, such as a first plasma gas port 112, a second plasma gas port 114, and a shield gas port 116. In some embodiments, the gas supply ports can include one or more bullet plugs for connecting different gases/gas supplies to the torch.

The coolant or gas connections can include one or more seals within the lead plug or the receptacle. For example, in some embodiments, the coolant supply port 104, the gas supply ports 112, 114, 116, and the coolant return port 106 include o-ring sealing members. In some cases, threads of the connector 120 (discussed below) are configured to engage with the torch lead receptacle before the o-ring sealing members engage with their complementary ports. As discussed herein configurations and locations of the various ports are typically designed to reduce interference, increase flow rates, help align components, increase creepage and clearance distances, thermally isolate channels, and achieve various other objectives. In some embodiments, once installed, o-ring sealing members can be substantially static connections, unlike some conventional systems. In some embodiments, o-ring sealing members on the main current carrier can be designed to create leak before having an electrical short and can serve as the fail point limiting arcing across that surface (e.g., at 300A), which could damage components.

Electrical contacts, such as the ohmic contact connector 108 and the pilot arc contact connector 110 are arranged and configured to convey current to and from the torch. In some embodiments, the ohmic contact connector 108 is integrated into the torch lead line and connects with the power supply through the lead plug-to-receptacle connection. In some conventional systems, the ohmic sense line and connection point have been external to the lead line itself and did not pass through the torch lead connection point, which would typically require an additional connection to be made and a set of wires to be mated during set up and installation. In such conventional systems, the ohmic sense line could break out of the lead somewhere along its length (e.g., about 3 feet from the power supply) and go to some portion of the system (e.g., torch height controller (THC) or voltage power divide in the power supply, etc.). Such a configuration would typically require additional technician and/or end user interaction with the ohmic sense circuit. Whereas, in some embodiments, the ohmic sense circuit of the systems and methods described herein (e.g., having the ohmic contact connector 108) can pass directly through the lead plug-to-receptacle interface. In such a connection, the ohmic sense circuit passes through the torch connect console and to a board in this system in a clean, simple, and contained manner. In some embodiments, an ohmic sense line within the torch that connects to the ohmic contact connector 108 can run substantially outside of the torch lead cladding for the length of the lead to reduce (e.g., minimize) noise interference.

One or more of the various other electrical connections described herein can include components to increase electrical conductivity between the lead plug and the receptacle. For example, as discussed above, multiple current carrying multiple contact bands can be used at the interface between the lead plug and the receptacle. In some cases, the current carrying multiple contact bands can be used at the low current, high voltage contact points, such as for the ohmic contact connector 108 or the pilot arc contact connector 110.

In some embodiments, the lead plug 100 can also be configured to transmit data to and from the torch by a communication connector 118 disposed within or coupled to the base portion 102. For example, in some embodiments, the lead plug further includes a communication connector (e.g., a valve driver cable) 118 disposed external to the base portion 102 and configured to communicatively connect the liquid-cooled plasma cutting system to a valve in the torch. In some embodiments, the communication connector 118 can be integrated within the base portion 102.

In some embodiments, the lead plug 100 connection points, such as the coolant ports 104, 106, electrical connections 108, 110, and gas ports 112, 114, 116 are arranged at various off-center (e.g., non-symmetrical) locations about the lead plug-to-receptacle interface. In some embodiments, the coolant ports 104, 106 can be disposed near or along a central axis region of the base portion 102. For example, the coolant supply port 104 can be disposed at or near an upper region of a central, vertical axis 109 and the coolant return port 106 can be disposed at or near a lower region of the central, vertical axis 109. That is, the coolant supply and coolant return ports can be disposed at substantially opposite regions of a central, vertical axis 109 of the base portion 102.

In some embodiments, this orientation allows for coolant ports having larger diameters to avoid fluid pressure drops in the coolant flow paths. In some embodiments, the lead plug is substantially free of connections.

In some embodiments, the pilot arc contact 110 and the first plasma gas port 112 are each located adjacent to the coolant supply port 104. In some embodiments, the coolant return port 106 and the coolant supply port 104 are disposed at opposite sides of the base portion 102 relative to a central region 107 of the base portion 102. Such configurations can help increase electrical isolation based off of console layout constraints.

In some embodiments, processing gas supply ports 112, 114, 116 are disposed circumferentially (along a substantially arc-like path) between the coolant return port 106 and the coolant supply port 104. Such configurations can help increase electrical isolation based off of console layout constraints.

In some cases, one or more of the gas supply ports can be disposed across from one or more of the electrical contacts. For example, in some embodiments, the ohmic contact connector 108 is disposed on an opposite side of the base portion 102 from the plasma processing gas supply port 112, 114, 116 relative to the central region 107.

The lead plug 100 can also include a connector (e.g., fastener) 120 disposed about the base portion 102. The connector 120 is configured to couple (e.g., affix, attached, otherwise connect) the base portion 102 to the liquid-cooled plasma cutting system and to operably connect the various ports, including each of the coolant supply 104, the coolant return 106, the gas supply ports 112, 114, 116, and the electrical connections 108, 110, to respective complementary connections of a torch lead receptacle 200 of the liquid-cooled plasma cutting system upon coupling to the liquid-cooled plasma cutting system. In some embodiments, the connector 120 can include a threaded member (e.g., a threaded nut) configured to be threaded onto a threaded portion of the receptacle. In some embodiments, the threaded nut can include or define single start stub acme threads.

Referring to FIG. 2, a plasma arc processing system (e.g., a liquid-cooled plasma arc power supply) can include a receptacle 200 to which the lead plug 100 can be connected to connect the torch and torch lead to the power supply. As depicted in FIG. 2, the receptacle 200 can include a complementary set of ports that align with the ports of the torch lead upon connection of the lead plug 100 to the receptacle 200. For example, the receptacle 200 can include a set of ports that can include one or more coolant ports, such as a coolant supply opening (i.e., for supplying coolant to the torch) 204, a coolant return opening (i.e., to receive coolant returning from the torch) 106, one or more electrical connections, such as an ohmic contact connector 208 and a pilot arc contact connector 210, and one or more gas ports, such as a first plasma gas port 212, a second plasma gas port 214, and a shield gas port 216. Additionally, in some cases, the receptacle 200 can include a grounding surface 205, which can be defined around an outer edge of a face 203 of the receptacle. Unless otherwise stated, the configuration, positions, and arrangements of the ports of the receptacle can complement (e.g., substantially mirror) those of the lead plug ports. In some embodiments, the complementary configuration can offers all of the necessary connections under one connector (e.g., nut).

Additionally, in some embodiments, the connection point/interface between the lead plug 100 and the receptacle 200 can serve as the grounding mechanism, which can be useful to help diminish or reduce noise to the system generated by the high frequency starting process. This can be advantageous compared to some conventional systems in which a clamp (e.g., hose clamp) can tighten down/ground the leads in the system to perform this function, which can complicate the installation and setup process and potentially lead to faulty connections and increased incidence of improper installation and noise issues. Whereas, in some embodiments, the components (e.g., the lead plug 100 and the system receptacle 200) stop on each other and create the ground interface that can be helpful to provide a stronger connection and limit (or eliminate) noise to the system. This ground interface can be formed (e.g., connected, created, established) when the lead plug 100 is connected to the system (e.g., screwed into the system and bottoms out on the receptacle 200) and the two metal interfaces along an outer region (e.g., perimeter) of the interface contact one another, grounding the outer components. This union of the two parts can help to insulate them from one another, separating the low voltage paths from the high voltage/high frequency paths.

Referring to FIGS. 3A through 3E, the systems described herein (e.g., the lead plug 100 and the receptacle 200) can be used to carry out various methods of aligning and connecting a plasma arc torch lead plug (e.g., the lead plug 100) to a system connector (e.g., the receptacle) 200 of a liquid-cooled plasma cutting system.

Figure 3A:
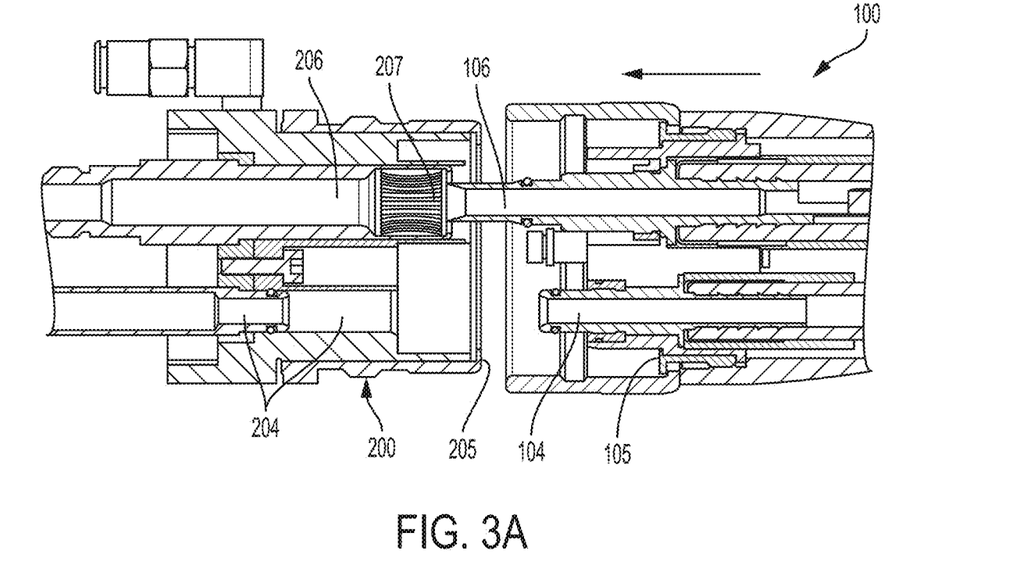
FIGS. 3A-3E are sequential cross-sectional views of an example torch lead plug being connected to an example processing system receptacle, depicting a multi-step alignment and connection sequence.

For example, referring to FIG. 3A, the methods can first include aligning the lead plug 100 with the receptacle 200 by inserting a coolant return port (e.g., return port 106) extending from a base portion (e.g., the base portion 102) of the lead plug into a coolant return opening 206 of the receptacle. For example, in a first phase of a coarse alignment of the lead plug 100 with the receptacle 200, the coolant return port 106 can be inserted into the coolant return opening 206.

Figure 3B:
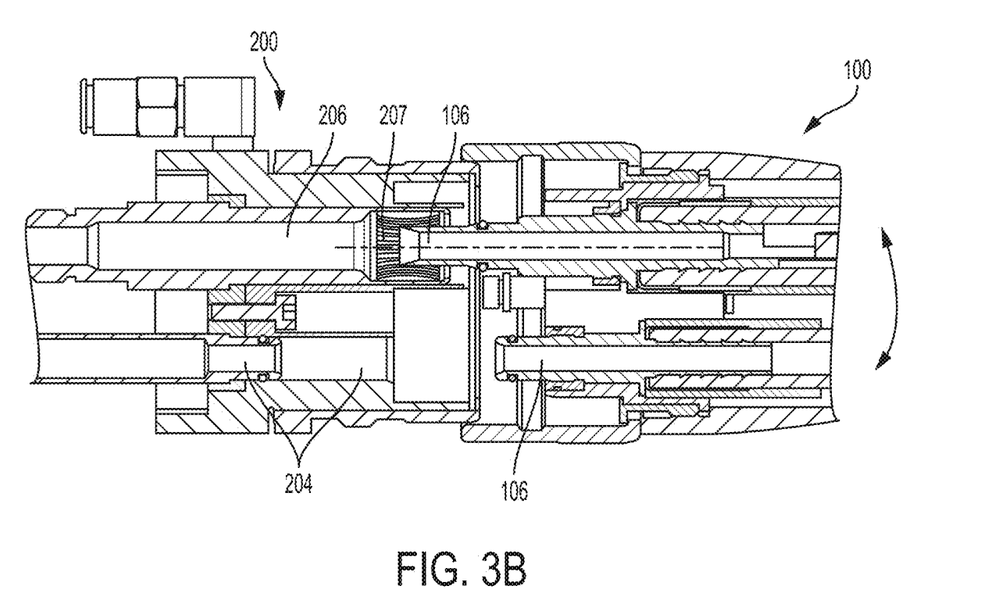

Referring to FIG. 3B, the methods can next include adjusting the lead plug 100 by rotating the lead plug relative to a central axis of the coolant return port 106 to align a connector 120 disposed about the base portion 102 with a complementary receiving mechanism 220 of the receptacle of the liquid-cooled plasma cutting system. For example, with the coolant return port 106 partially inserted into the receptacle, in a second phase of the coarse alignment, the lead plug can be adjusted to approximately align the connector 120 to the receiving mechanism 220.

Figure 3C:
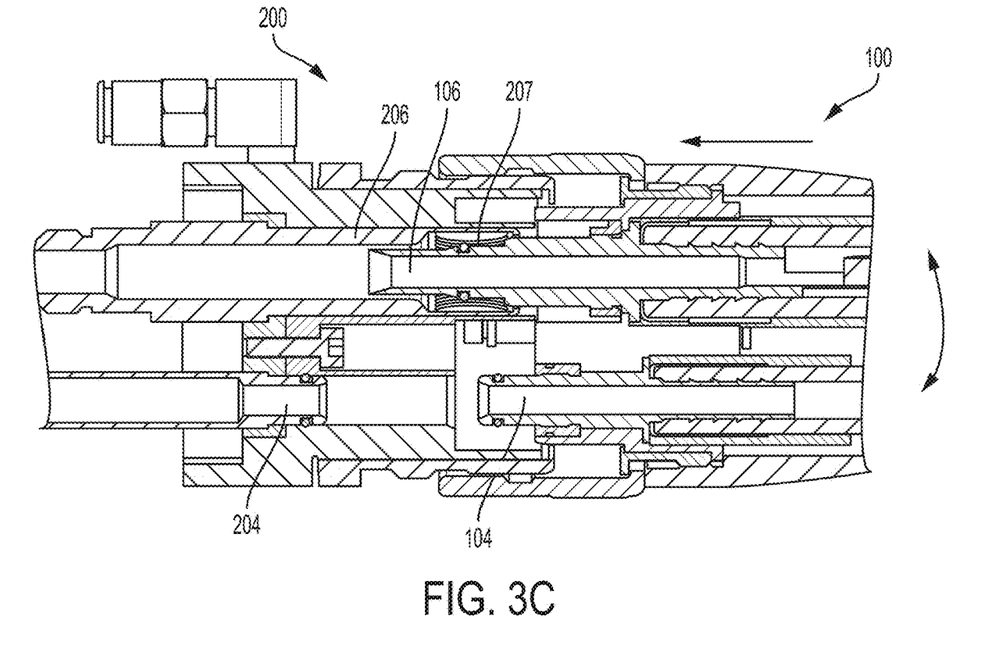

Referring to FIG. 3C, the methods can next include advancing the lead plug 100 towards the receptacle to: further insert the coolant return port 106 into the coolant return opening 206 to establish an electrical connection between the coolant return port 106 and the coolant return opening 206 to provide the operational current to the plasma arc torch; and to insert a coolant supply port 104 into a corresponding coolant supply opening 204 of the receptacle. That is, in a first phase of fine alignment, the other liquid coolant port (i.e., other than the coolant return port 106) can be aligned with the complementary port in the receptacle. As such, a tolerance (e.g., diametric tolerance) between the coolant supply port 104 and the coolant supply opening 204 can be tighter than the tolerance between the coolant return port 106 and the coolant return opening 206. In some embodiments, the establishing the electrical connection between the coolant return port and the coolant return opening can include contacting a current carrying multiple contact band disposed within the coolant return opening with the coolant return port. As discussed above, the coolant return port 106 can have an axial length that is greater than the other ports, which can be useful in order to establish a connection with the coolant return opening before other ports of the lead plug establish a connection with complementary connections of the connector.

Figure 3D:
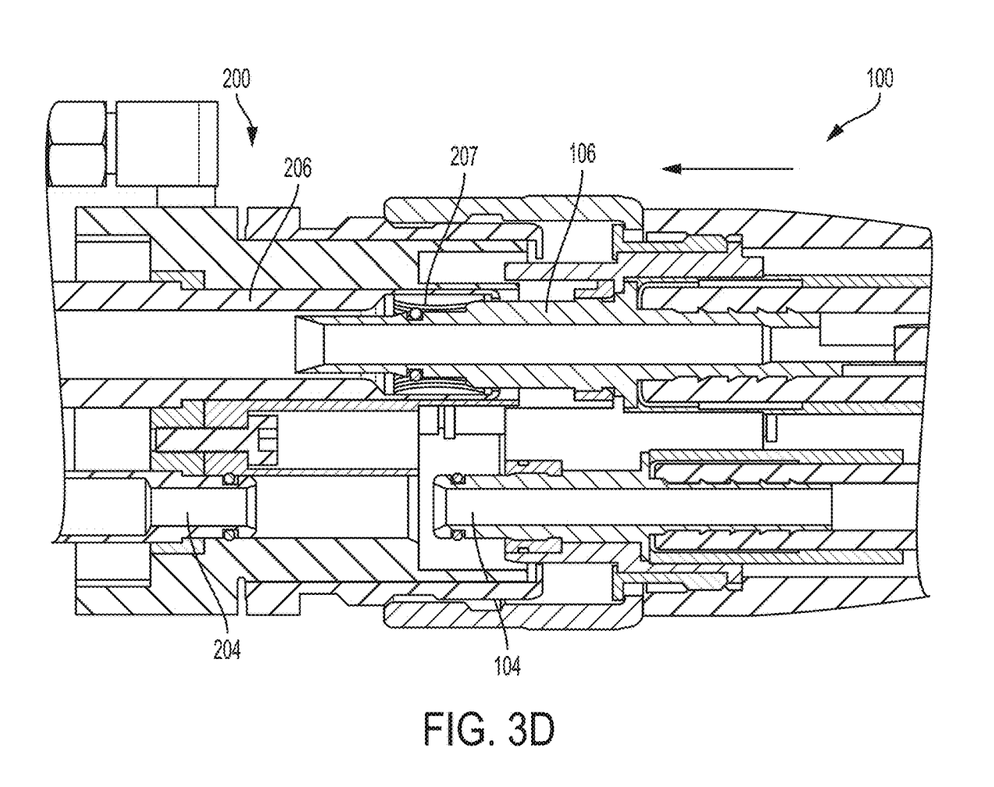

As depicted in FIG. 3D, with the coolant ports aligned and slightly inserted, the lead plug can be fully aligned with the receptacle so that the connector 120 can abut, and be ready to engage the receiving mechanism 220. Referring to FIG. 3D, the methods can next include engaging the connector 120 with the complementary receiving mechanism 220 to: establish an electrical connection between a pilot arc connector of the lead plug and a complementary pilot arc contact of the connector; establish an electrical connection between an ohmic contact of the lead plug and a complementary ohmic contact of the connector; and establish one or more fluid connections to provide processing gases to the plasma arc torch. In some embodiments, the engaging the connector 120 with the complementary receiving mechanism 220 can include rotating a threaded connector relative to a threaded complementary receiving mechanism.

Figure 3E:
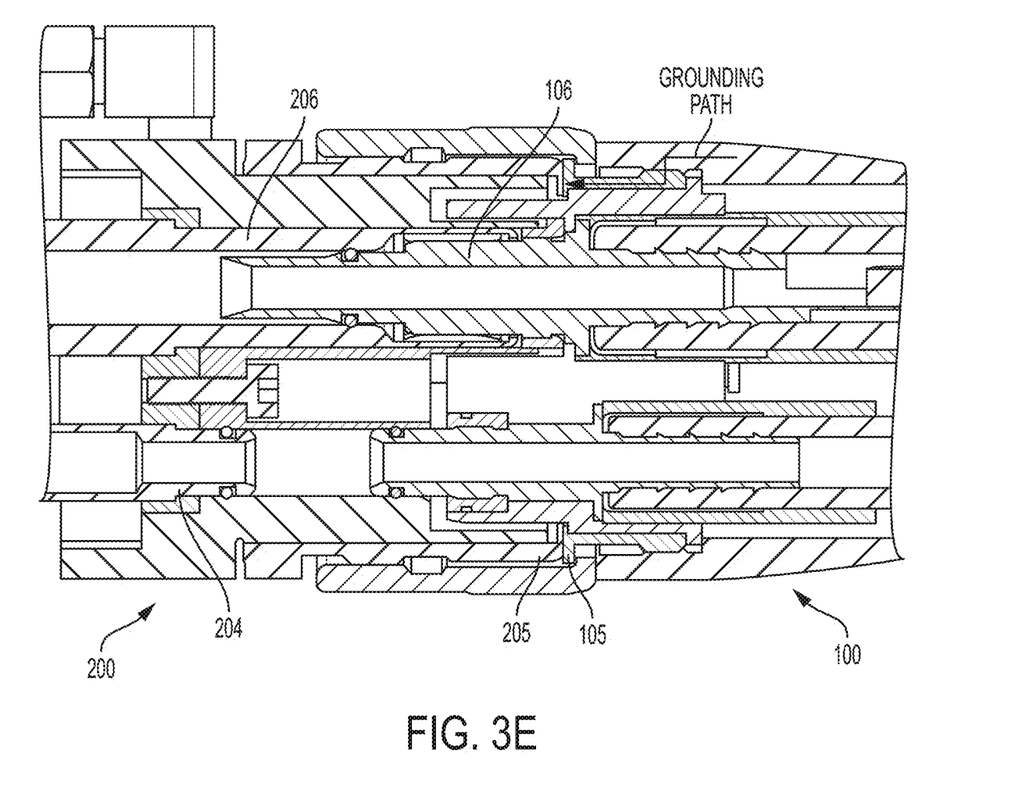

Referring to FIG. 3E, with the connector 120 fully threaded onto the receiving mechanism 220, the lead plug can be fully engaged with the receptacle so that all port connections are made, forming the various fluid seals and electrical connections. For example, all of the o-rings can be sealed and the current carrying multiple contact bands can be engaged. Also, as illustrated, a grounding path can be formed when the front face of the lead plug contacts the complementary face of the receptacle.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A liquid-cooled plasma cutting system contact member to connect a plasma torch lead to a liquid-cooled plasma cutting system, the contact member comprising:
   a base portion having a central vertical axis, the base portion defining opposite regions and configured to be coupled to the plasma torch lead;
   the base portion defines a front face, the front face comprising an electrical grounding surface formed along an outer edge of the front face;
   a set of ports disposed within the base portion, the set of ports including:
      a coolant supply port to convey a liquid coolant from the liquid-cooled plasma cutting system to a plasma arc torch connected to the contact member by the plasma torch lead,
      a coolant return port: i) defining a passage to convey return liquid coolant from the plasma arc torch to the liquid-cooled plasma cutting system, and ii) being configured to convey an operational current from the liquid-cooled plasma cutting system to the plasma arc torch connected to the base portion by the plasma torch lead, the coolant supply port and the coolant return port disposed along the central vertical axis and disposed at the opposite regions of the base portion,
      at least one plasma processing gas supply port to convey a plasma processing gas from the liquid-cooled plasma cutting system to the plasma arc torch, and
      an ohmic contact connector; and
   a connector disposed about the base portion to couple the base portion to the liquid-cooled plasma cutting system and operably connect each of the coolant supply, the coolant return, the gas supply, the electrical grounding surface formed along an outer edge of the front face, and the ohmic contact connector to respective complementary connections of a torch lead receptacle of the liquid-cooled plasma cutting system upon coupling to the liquid-cooled plasma cutting system.

2. The contact member of claim 1, further comprising a pilot arc contact, the pilot arc contact and the at least one plasma processing gas supply port are each located adjacent to the coolant supply port.

3. The contact member of claim 1, wherein the coolant return port and the coolant supply port are disposed at opposite sides of the base portion relative to a central region.

4. The contact member of claim 3, wherein the at least one plasma processing gas supply port is disposed circumferentially between the coolant return port and the coolant supply port.

5. The contact member of claim 4, wherein the ohmic contact connector is disposed on an opposite side of the base portion than the at least one plasma processing gas supply port relative to the central region.

6. The contact member of claim 1, wherein the set of ports extend from the front face.

7. A liquid-cooled plasma cutting system contact member to connect a plasma torch lead to a liquid-cooled plasma cutting system, the contact member comprising:
   a base portion having a central vertical axis, the base portion defining opposite regions and configured to be coupled to the plasma torch lead;
   a set of ports disposed within the base portion, the set of ports extending from a from face of the base portion, the set of ports including:
      a coolant supply port to convey a liquid coolant from the liquid-cooled plasma cutting system to a plasma arc torch connected to the contact member by the plasma torch lead,
      a coolant return port: i) defining a passage to convey return liquid coolant from the plasma arc torch to the liquid-cooled plasma cutting system, and ii) being configured to convey an operational current from the liquid-cooled plasma cutting system to the plasma arc torch connected to the base portion by the plasma torch lead, the coolant supply port and the coolant return port disposed along the central vertical axis and disposed at the opposite regions of the base portion,
      at least one plasma processing gas supply port to convey a plasma processing gas from the liquid-cooled plasma cutting system to the plasma arc torch, at least one of the coolant supply or the coolant return ports extend axially farther from the front face than the other ports in the set of ports, and
      an ohmic contact connector; and
   a connector disposed about the base portion to couple the base portion to she liquid-cooled plasma cutting system and operably connect each of the coolant supply, the coolant return, the gas supply, and the ohmic contact connector to respective complementary connections of a torch lead receptacle of the liquid-cooled plasma cutting system upon coupling to the liquid-cooled plasma cutting system.

8. The contact member of claim 1, wherein the coolant return port has a width that is greater than a width of the coolant supply port.

9. The contact member of claim 1, wherein the coolant return port includes a current carrying multiple contact band.

10. The contact member of claim 1, wherein the coolant supply port, the gas supply port, and the coolant return port include o-ring sealing members.

11. The contact member of claim 10, wherein threads of the connector are axially positioned relative to the base portion to engage with the torch lead receptacle before the o-ring sealing members engage with their complementary ports.

12. A liquid-cooled plasma cutting system contact member to connect a plasma torch lead to a liquid-cooled plasma cutting system, the contact member comprising:
- a base portion having a central vertical axis, the base portion defining opposite regions and configured to be coupled to the plasma torch lead;
- a set of ports disposed within the base portion, the set of ports including:
  - a coolant supply port to convey a liquid coolant from the liquid-cooled plasma cutting system to a plasma arc torch connected to the contact member by the plasma torch lead,
  - a coolant return port: i) defining a passage to convey return liquid coolant from the plasma arc torch to the liquid-cooled plasma cutting system, and ii) being configured to convey an operational current from the liquid-cooled plasma cutting system to the plasma arc torch connected to the base portion by the plasma torch lead, the coolant supply port and the coolant return port disposed along the central vertical axis and disposed at the opposite regions of the base portion,
  - at least one plasma processing gas supply port to convey a plasma processing gas from the liquid-cooled plasma cutting system to the plasma arc torch, and
  - an ohmic contact connector; and
- a valve driver cable disposed external to the base portion and configured to communicatively connect the liquid-cooled plasma cutting system to a valve in the torch; and
- a connector disposed about the base portion to couple the base portion to the liquid-return cooled plasma cutting system and operably connect each of the coolant supply, the coolant return, the gas supply, and the ohmic contact connector to respective complementary connections of a torch lead receptacle of the liquid-cooled plasma cutting system upon coupling to the liquid-cooled plasma cutting system.

* * * * *

UNITED STATES PATENT AND TRADEMARK OFFICE
CERTIFICATE OF CORRECTION

PATENT NO. : 11,059,122 B2  
APPLICATION NO. : 15/845711  
DATED : July 13, 2021  
INVENTOR(S) : Jeremy Beliveau Page 1 of 1

It is certified that error appears in the above-identified patent and that said Letters Patent is hereby corrected as shown below:

In the Claims

In Column 10, Line 34 of Claim 7 delete "from a from face," and replace it with --from a front face,--.

In Column 10, Line 58 of Claim 7 delete "portion to she liquid." and replace it with --portion to the liquid,--.

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*